US008150006B2

(12) United States Patent
Dowens et al.

(10) Patent No.: US 8,150,006 B2
(45) Date of Patent: Apr. 3, 2012

(54) METHOD AND APPARATUS FOR PERFORMING CALL CORRELATION ACROSS NETWORK ELEMENTS

(75) Inventors: John P. Dowens, Red Bank, NJ (US); Trevor Byer, Lincroft, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1143 days.

(21) Appl. No.: 11/937,182

(22) Filed: Nov. 8, 2007

(65) Prior Publication Data

US 2009/0122969 A1 May 14, 2009

(51) Int. Cl.
*H04M 11/00* (2006.01)
*G06Q 20/00* (2012.01)

(52) U.S. Cl. ............ 379/112.01; 370/230.1; 379/14.01; 379/88.22; 379/114.01; 379/126; 379/189; 455/406; 455/427; 705/30; 709/224

(58) Field of Classification Search ............... 370/230.1; 379/14.01, 112.01, 112.06, 126, 189; 455/406, 455/427; 709/224; 705/30
See application file for complete search history.

(56) References Cited

U.S. PATENT DOCUMENTS

| 5,027,388 | A  | * | 6/1991 | Bradshaw et al. | 379/114.1 |
| 5,774,532 | A  | * | 6/1998 | Gottlieb et al. | 379/112.01 |
| 6,064,881 | A  | * | 5/2000 | Shea et al. | 455/427 |
| 6,480,844 | B1 | * | 11/2002 | Cortes et al. | 1/1 |
| 6,721,554 | B2 | * | 4/2004 | Gnesda et al. | 455/406 |
| 6,891,938 | B1 | * | 5/2005 | Scott et al. | 379/112.06 |
| 7,231,026 | B2 | * | 6/2007 | Lampell et al. | 379/189 |
| 7,263,180 | B2 | * | 8/2007 | Kreckel et al. | 379/126 |
| 7,424,103 | B2 | * | 9/2008 | Kernohan et al. | 379/126 |
| 7,466,652 | B2 | * | 12/2008 | Lau et al. | 370/230.1 |
| 7,496,185 | B1 | * | 2/2009 | Primavesi et al. | 379/126 |
| 7,505,567 | B1 | * | 3/2009 | Eslambolchi et al. | 379/14.01 |
| 7,583,794 | B1 | * | 9/2009 | Croak et al. | 379/126 |
| 7,609,826 | B2 | * | 10/2009 | Liu et al. | 379/126 |
| 7,610,371 | B2 | * | 10/2009 | Enqvist | 709/224 |
| 7,739,159 | B1 | * | 6/2010 | Chandrupatla et al. | 705/30 |
| 2005/0226400 | A1 | * | 10/2005 | Farber et al. | 379/114.01 |
| 2008/0084975 | A1 | * | 4/2008 | Schwartz | 379/88.22 |
| 2009/0122969 | A1 | * | 5/2009 | Dowens et al. | 379/112.01 |

* cited by examiner

Primary Examiner — Gerald Gauthier

(57) ABSTRACT

Method and apparatus for performing call correlation across network elements are disclosed. For example, the method receives by a first correlation engine one or more Call Detail Records (CDRs) from one or more network elements at a completion of a call wherein each of said one or more CDRs contains a correlation identification and a service identification. The method identifies a list of expected CDRs for said call and determines whether all of said expected CDRs for said call are received. The method then creates a CDR set for the call.

11 Claims, 5 Drawing Sheets

200

METHOD AND APPARATUS FOR PERFORMING CALL CORRELATION ACROSS NETWORK ELEMENTS

The present invention relates generally to communication networks and, more particularly, to a method and apparatus for providing call detail record correlation across network elements in networks, e.g., Internet Protocol (IP) networks, Voice over Internet Protocol (VoIP) networks, Virtual Private Networks (VPN), etc.

BACKGROUND OF THE INVENTION

When an impairment is detected by a network service provider and/or is reported by a customer, the network service provider troubleshoots the impairment and performs the necessary remedies. For example, work center personnel may poll each device involved in handling a call for a customer, e.g., the endpoint devices, border routers, etc., and gather call detail records.

SUMMARY OF THE INVENTION

In one embodiment, the present invention discloses a method and apparatus for performing call correlation across network elements. For example, the method receives by a first correlation engine one or more Call Detail Records (CDRs) from one or more network elements at a completion of a call wherein each of said one or more CDRs contains a correlation identification and a service identification. The method identifies a list of expected CDRs for said call and determines whether all of said expected CDRs for said call are received. The method then creates a CDR set for the call.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing call detail record correlation across network elements in a network. Although the present invention is discussed below in the context of packet networks, the present invention is not so limited. Namely, the present invention can be applied for other networks, e.g., switched networks and the like.

Figure 1:
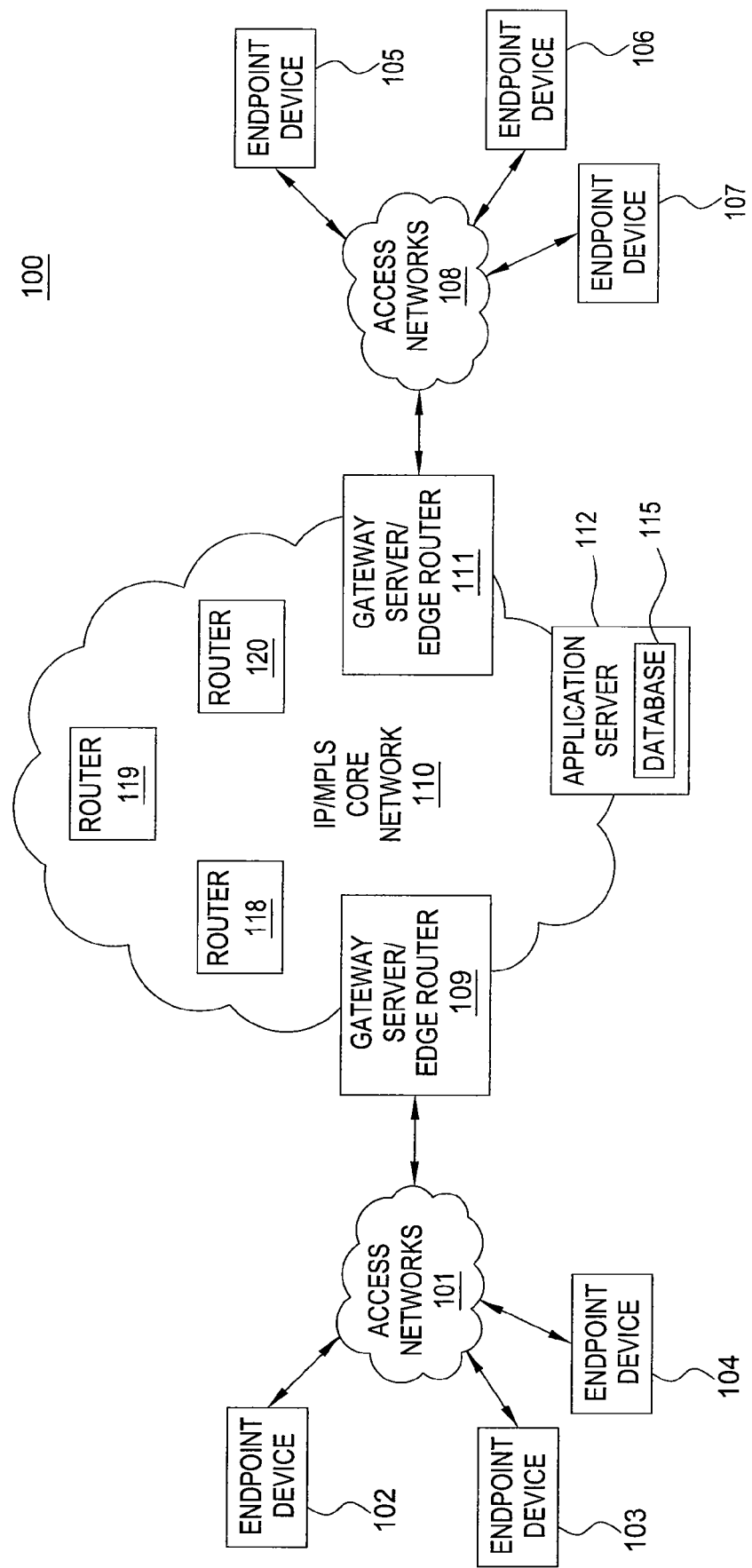
FIG. 1 illustrates an exemplary network related to the present invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via one or more access networks 101. Similarly, a plurality of endpoint devices 105-107 are configured for communication with the core packet network 110 via one or more access networks 108. The network elements 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device.

The IP/MPLS core network 110 also may comprise an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and so on are depicted in FIG. 1, the communication system 100 may be expanded by including additional endpoint devices, access networks, border elements, etc. without altering the present invention.

The above IP network is described to provide an illustrative environment in which packets for voice and data services are transmitted on networks. When an impairment is detected by a network service provider and/or is reported by a customer, the network service provider troubleshoots the impairment and performs the necessary remedies. For example, work center personnel for a network service provider may poll each device involved in handling a call for the customer and gather the associated Call Detail Records (CDRs). A CDR refers broadly to a record in which call data for an individual call is recorded. The CDR may include details of each call such as the calling party, the called party, the source and destination IP addresses of the routers or border elements handling the call, the start time of the call, the duration of the call, the quality of service, the disposition of the call including whether or not the called party was busy, whether or not the phone was ringing with no answer, and the like. For example, if a customer accesses an IP service, e.g., a Voice over Internet Protocol (VoIP) service and initiates a call, a CDR may be created for each VoIP leg of the call by each voice gateway router. For example, each network element supporting the call may generate a CDR for the call. The CDR can be used for performing various functions, e.g., for accounting processes that partition charges among multiple carriers that may have transported the voice packets of a call, for billing processes that create bills requiring payment for services, for issuing rebates, and so on.

The work center personnel may determine the cause of an impairment by analyzing the gathered CDRs. The above manual troubleshooting performed by work center personnel is costly for large provider networks. For example, customers may be unwilling to wait a long period of time associated with such a manual process. In a large service provider network, the work center personnel may need to detect and fix the service problems within a specific time window. For example, premium managed service customers may require the trouble to be remedied before he/she calls the help desk. Hence, the trouble detection process may be automated as much as possible to bring troubles immediately to the attention of the work center personnel. As such, the automated trouble detection process may rely on an automated process for gathering CDRs from various network elements and correlating the contents of the CDRs. Network service providers may set timers and correlate CDRs received within a time window. However, if a CDR is not received in a timely manner from one or more network elements handling the call, the correlation engine may not realize the missing CDRs and may make an erroneous analysis.

The current invention provides a method and apparatus for providing a call detail record correlation across network elements. When a call is transmitted on a packet network, there may be many voice gateway network elements and application servers that are used to handle the call. Calls originated at one voice gateway network element may terminate on any other voice gateway network element. Application servers may be used to provide some billable service functions, e.g., teleconferencing, 3-way calling, storing of messages at a message center, and so on. When a call is completed, call detail records are generated by the ingress and egress voice gateway network elements and one or more application servers for each call leg.

In one embodiment, the network service provider may use more than one correlation engine for CDR gathering and analysis. For example, a CDR correlation engine may be assigned to serve a particular list of routers, switches, and application servers based on physical proximity. That means, the network service provider may deploy multiple correlation engines in the network and assign a particular list of routers, switches and application servers to each correlation engine. Each voice gateway network element or application server for a call leg may then send call detail records to a particular correlation engine for analysis.

Those skilled in the art would realize physical proximity is one parameter among many parameters that are used in the assignment of a particular correlation engine to a router. For example, the type of network element or type of function performed by the network element may be used without any loss of functionality.

As described above, each call may be handled by various gateway network elements and application servers. The list of gateway network elements and applications servers needed to handle a call depends on the type of service. In one example, a conference call may be facilitated by a specific application server in a network. In another example, international calls may be handled by specific application servers optimized for international calls.

In one embodiment, the current invention first creates service specific profiles in the correlation engine based on call flows for each type of service and a list of network elements handling a call for each of the types of services. The service specific profile contains a service identification (e.g., a type of call), a list of network elements that will generate CDRs for a call, and configurable timers for each network element generating said CDRs for the call. The service identification (type) is included in the CDRs created by each network element.

Table-1 provides an illustrative table for service specific profiles in a correlation engine. To illustrate, for service #1, two CDRs are expected from switch A with a timer of 5 minutes, and one CDR is expected from an application server with a timer of 60 minutes. For service #2, one CDR is expected from switch B with a timer of 5 minutes, one CDR is expected from an application server with a timer of 60 minutes, and one CDR is expected from switch C with a timer of 5 minutes. For service #3, the 4 CDRs: one with a timer of 5 minutes from a Breakout Gateway Control Function (BGCF) that determines which media gateway control function that a call should go through to reach a Public Switched Telephone Network (PSTN), one with a timer of 30 minutes from an Interrogating-Call Session Control Function (I-CSCF), one with a timer of 5 minutes from a Serving-Call Session Control Function (S-CSCF), and one with a timer of 60 minutes from a Network Gateway Border Element (NGBE).

TABLE 1

A table for service specific profiles

| Service ID | Source of CDR | Timer in Minutes |
| --- | --- | --- |
| Service #1 | Switch A | 5 |
| | Switch A | 5 |
| | Application Server | 60 |
| Service #2 | Switch B | 5 |
| | Application Server | 60 |
| | Switch C | 5 |
| Service #3 | BGCF | 5 |
| | I-CSCF | 30 |
| | S-CSCF | 5 |
| | NGBE | 60 |

In one embodiment, the current invention also creates a "correlation engine list" in the correlation engine that contains the list of network elements (routers, switches, application servers, etc.) connected to each correlation engine. Table-2 provides an illustrative table for a correlation engine list. The switches and application servers sending CDRs to each correlation engine are listed. The addresses of network elements may be provided in any form the service provider deems identifiable. For example, IP addresses of the network elements, port identification, etc. may be used. Note that each correlation engine is made aware of the list of network elements sending CDRs to all correlation engines (to itself and other correlation engines). That means, the correlation engine list is replicated across all correlation engines.

TABLE 2

A table for a correlation engine list

| Correlation Engine (CE) Number | Source of CDR |
| --- | --- |
| CE #1 | Switch A with ID = 111 |
| | Application Server with APN = 193-222-1234 |
| | Switch A |
| | Switch B with trunk group number = 973-672-4444 |
| | Application Server with APN = 193-123-4343 |
| | Switch B |

TABLE 2-continued

A table for a correlation engine list

| Correlation Engine (CE) Number | Source of CDR |
|---|---|
| CE #2 | Switch C with trunk group number = 732-420-1234 |
| | Application Server with APN = 192-222-9999 |
| | Switch C |
| | Switch D with access ID = 222 |
| | Application Server with APN = 192-234-9999 |
| | Switch D |
| CE #3 | IPBE5@777.2222.33 |
| | AS5@654.3333.44 |
| | NGBE5@441.3333.44 |
| | I-CSCF@538.7777.66 |
| | IPBE6@888.3333.22 |
| | AS6@567.4444.22 |
| | NGBE6@335.6666.11 |
| | S-CSCF@237.666.88 |

Figure 2:
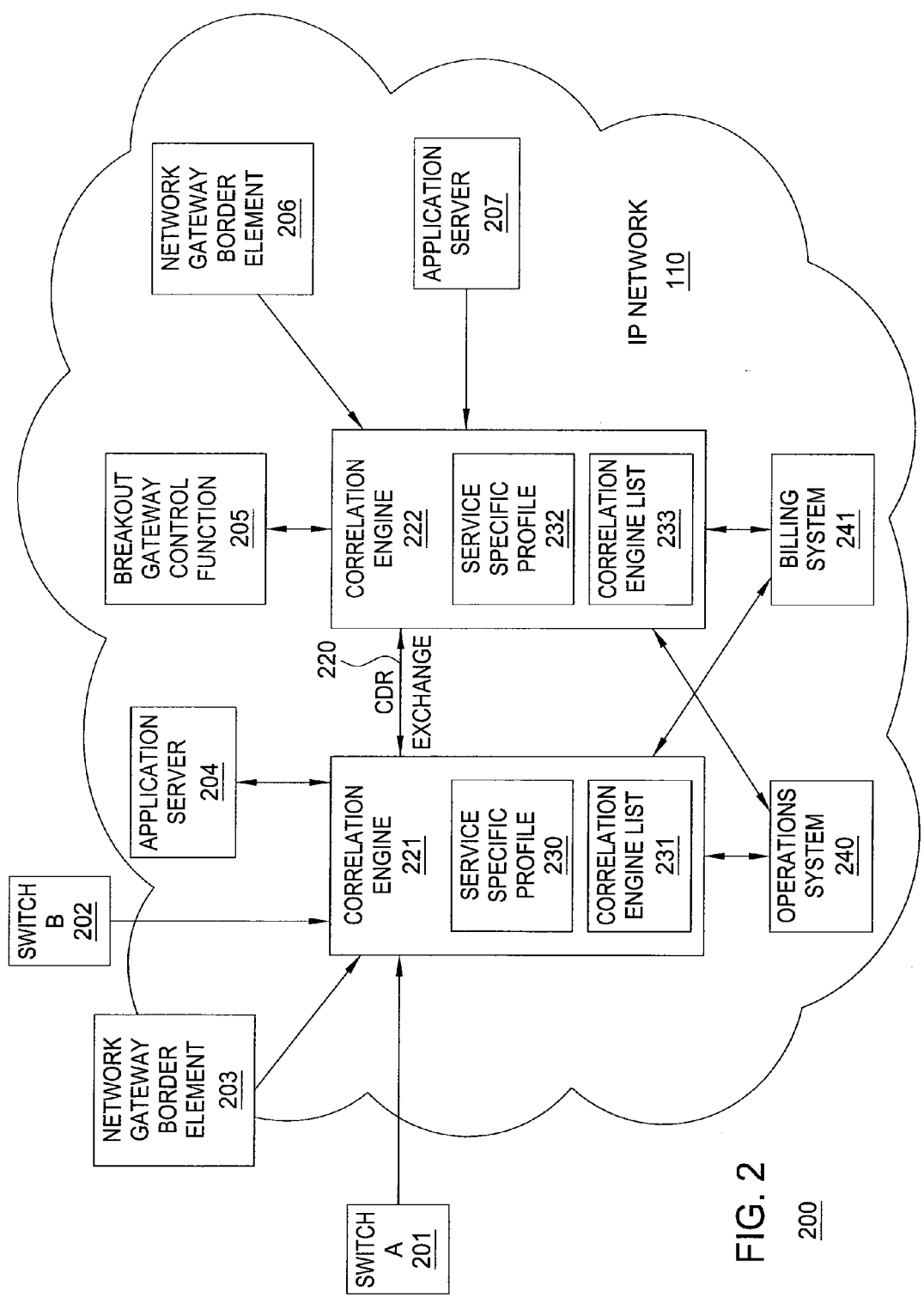
FIG. 2 illustrates an exemplary network with call detail record correlation.

FIG. 2 illustrates an exemplary network 200 with CDR correlation across network elements. For example, the network 200 may contain switches 201, 202, and IP network 110. IP network 110 may contain NGBEs 203 and 206, application servers 204 and 207, a BGCF 205, correlation engines 221 and 222, a billing system 241 and an operations system 240. Correlation engine 221 contains a service specific profile 230 and a correlation engine list 231. Correlation engine 222 contains a service specific profile 232 and a correlation engine list 233. Switches 201 and 202, NGBE 203, and application server 204 send CDRs to correlation engine 221. BGCF 205, NGBE 206 and application server 207 send CDRs to correlation engine 222. Correlation engines 221 and 222 may exchange CDRs via a communication path, e.g., a CDR exchange 220. Correlation engines 221 and 222 are also in communication with operations system 240 and billing system 241.

In FIG. 2, network elements handling a call (e.g., various types of network elements 201-207) create CDRs containing correlation identification (ID) and service ID and forward the CDRs to a particular correlation engine (e.g. correlation engine 221 or 222). The correlation ID is a code generated by the first network element for a call and signaled across the network to the last network element for the call.

When a correlation engine receives CDRs, it sorts the CDRs based on their correlation ID. The method then compares the service IDs of each received CDR against the service specific profiles in the correlation engine and identifies a list of CDRs it expects. For the example above in Table-1, if the service ID for a CDR is service #1, the profile in the correlation engine indicates "two CDRs from switch A and one CDR from an application server" are expected.

The method then determines whether or not all expected CDRs for the call are received. If all expected CDRs for a call are received, the method then constructs a CDR set and performs correlation. In one embodiment, the CDR set has a CDR set header containing:

A set indicator (e.g. "0" for a complete set and "1" for an incomplete set);
A service ID;
Number of CDRs in a set;
Number of CDRs missing; and
Network element addresses associated with missing CDRs.

In one embodiment, the CDR set may also be sent to operations and billing systems. For example, if a call experienced degradation, the CDR may include information that helps the billing system to modify charges for the call.

If there are any CDRs associated with a call that are not received, the correlation engine may analyze the ingress and egress address fields of each CDR and compare the addresses against network element addresses in its own list. For the example above, if the correlation engine performing the analysis is CE#1, it may examine the addresses against the following list:

Switch A with ID = 111
Application Server with APN = 193-222-1234
Switch A
Switch B with trunk group number = 973-672-4444
Application Server with APN = 193-123-4343
Switch B If the address field of a CDR is not listed in the correlation engine's own list, the correlation engine identifies the correlation engine responsible for that network element and sends a request for the CDR. For example, if the application server is the server with APN=192-234-9999, CE#1 examines Table-2 and determines the correlation engine responsible for that application server is CE#2. CE#1 then sends a request for a CDR exchange to CE#2. The request may contain the correlation ID and service ID. For the example in FIG. 2, CDR exchange 220 may be used.

If all CDRs are received in response to the requests for CDR exchange, the correlation engine may then construct a complete CDR set and perform correlation. If one or more CDRs are still missing, the method sets a timer for each missing CDR in accordance to intervals specified in the service specific profiles for the network elements responsible for each missing CDR. For the example above, if the service type is service #1 and the missing CDR is from switch A, the method sets the timer for switch A to 5 minutes and waits. If the timers expire before all missing CDRs are received, a CDR set is constructed with the header indicating an incomplete set. The CDR set also provides or indicates which network element CDRs are missing. If all missing CDRs are received before the timers expire, the CDR set is constructed with the header indicating a complete set.

In one embodiment, the current invention sends the CDR set to a network operations system. For example, a CDR set may be created with a CDR set header that indicates "set incomplete" to the network operations system.

Figure 3A:
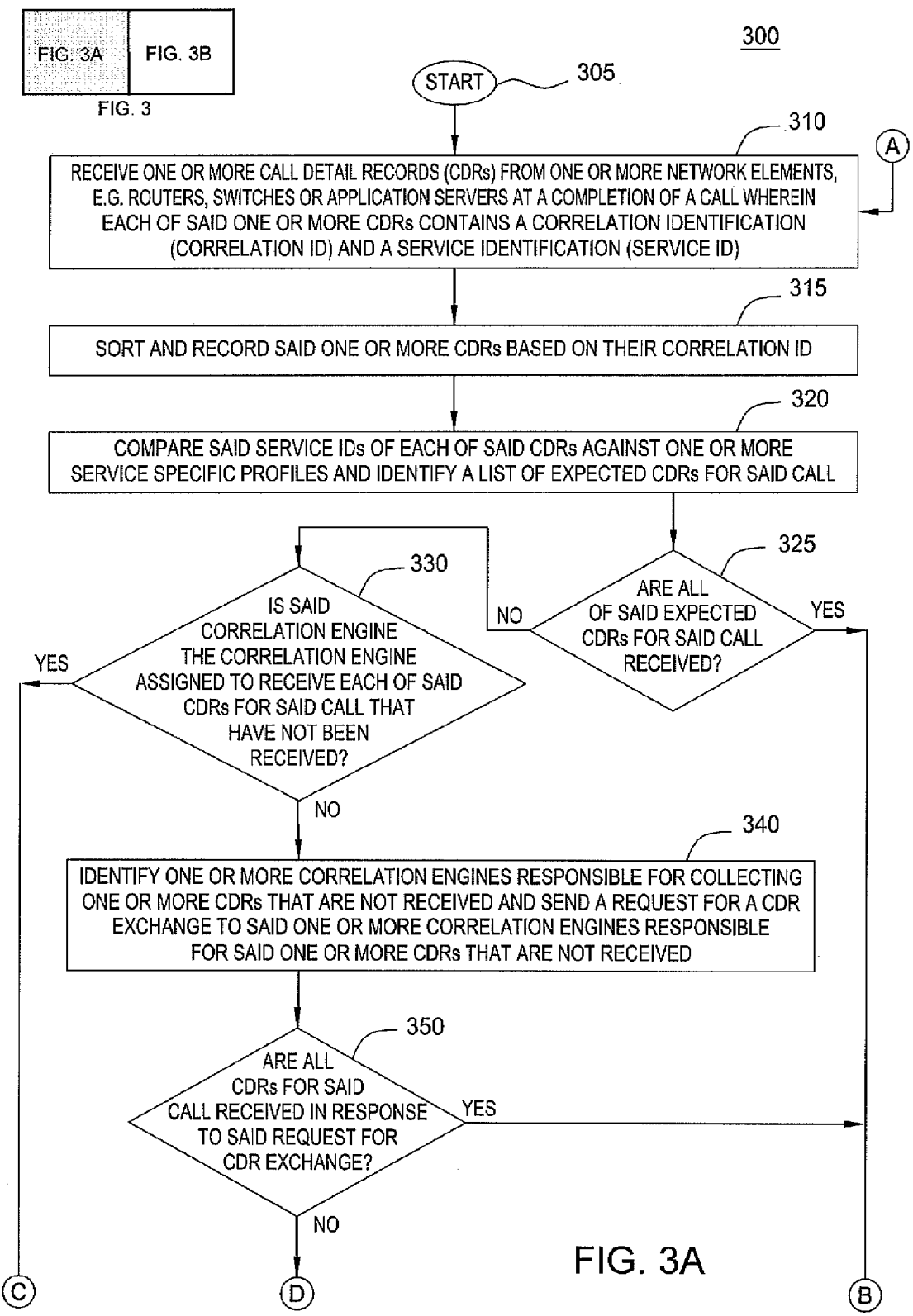
FIG. 3 illustrates a flowchart of a method for performing call correlation across network elements.
Figure 3B:
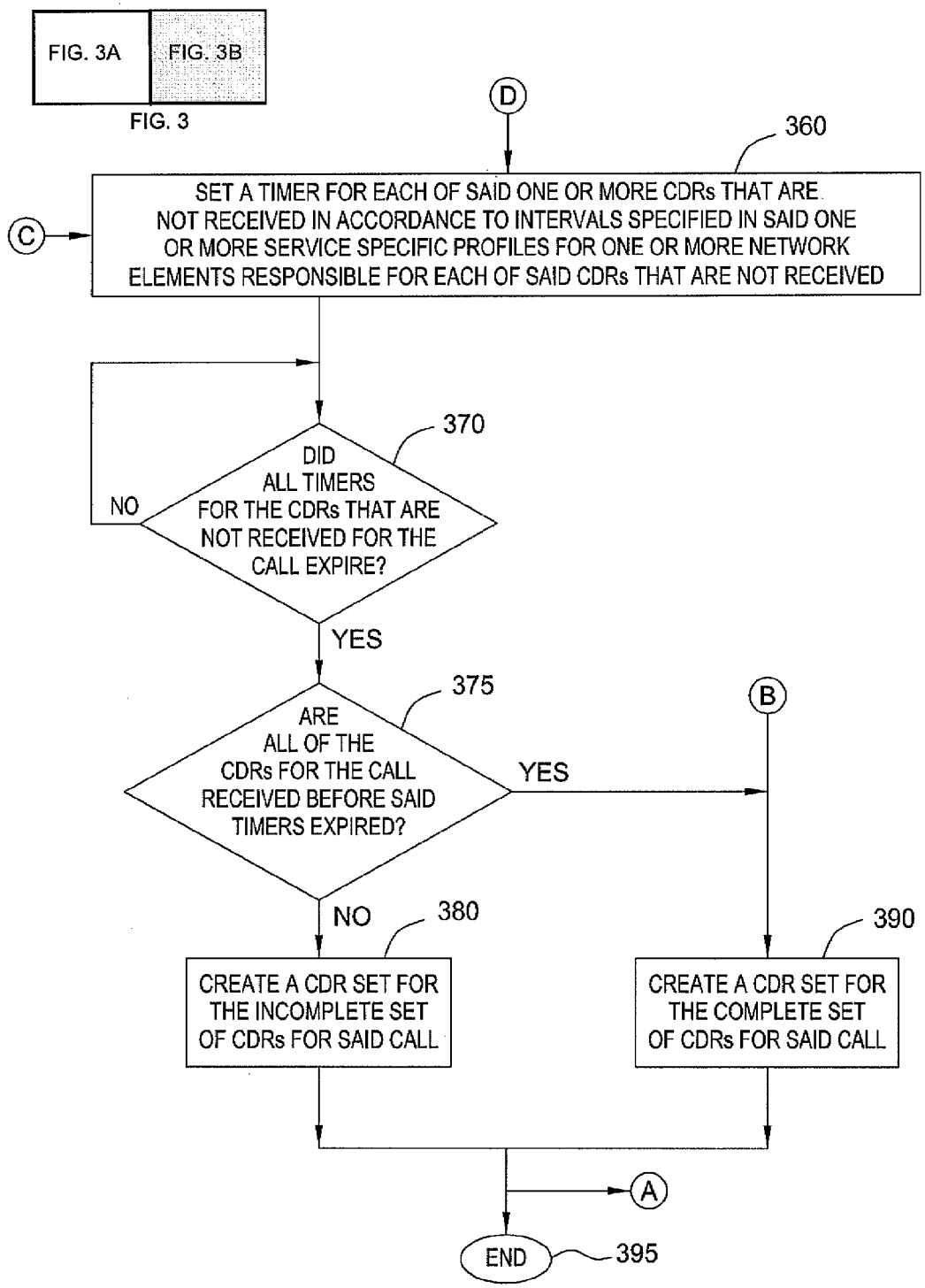

FIG. 3 illustrates a flowchart of a method 300 for CDR correlation across network elements. A service provider may enable each gateway router/switch (e.g., an ingress voice gateway router or an egress voice gateway router) and application server to send CDRs to a specific correlation engine at the termination or completion of each call. For example, when the called and calling parties terminate the call, each of the gateway routers supporting the called and calling parties' endpoints and application servers providing various services in support of the call may automatically generate and forward a call detail record. The CDRs are generated for each call leg and a call may be supported by any number of call legs. The service provider also provides each correlation engine with a service specific profile and a correlation engine list. The correlation engines are also enabled to construct a CDR set (e.g. with the CDR set header as described above).

Method 300 starts in step 305 and proceeds to step 310. In step 310, method 300 receives one or more Call Detail Records (CDRs) from one or more network elements, e.g., routers, switches or application servers at a completion of a call wherein each of said one or more CDRs contains a correlation identification (correlation ID) and a service identification (service ID). For example, a correlation engine receives CDRs from various network elements handling a call.

In step 315, method 300 sorts and records said one or more CDRs based on their correlation ID. For example, the method stores the CDRs in a table sorted based on correlation ID.

In step 320, method 300 compares said service IDs of each of said CDRs against one or more service specific profiles and identifying a list of expected CDRs for said call. For example, the correlation engine uses the service ID in a CDR to determine the complete list of CDRs that would be generated by various network elements for the type of service.

In step 325, method 300 determines whether or not all of said expected CDRs for said call are received. If all expected CDRs for a call are received, the method then proceeds to step 390 to construct a CDR set and perform correlation. Otherwise, the method proceeds to step 330.

In step 330, method 300 determines whether or not said correlation engine is the correlation engine assigned to receive each of said CDRs for said call that have not been received. For example, the correlation engine compares the ingress and egress address fields of each of said CDRs for a call against network element addresses in its own correlation engine list, and determines whether or not it is assigned to receive said CDRs. If said correlation engine is not assigned to receive at least one of the CDRs for said call, the method proceeds to step 340. Otherwise, the method proceeds to step 360 to set one or more timers.

In step 340, method 300 identifies one or more correlation engines responsible for collecting one or more CDRs that have not been received and sends a request for a CDR exchange to said one or more correlation engines responsible for said one or more CDRs that have not been received. For example, a request for CDR exchange that includes the correlation ID may be sent to other correlation engines that are assigned to receive one or more CDRs for the call associated with the correlation ID.

In step 350, method 300 determines whether or not all CDRs for said call are received in response to said request for CDR exchange. If all the missing CDRs for a call are received as a result of the request for CDR exchange, the method proceeds to step 390. Otherwise, the method proceeds to step 360.

In step 360, method 300 sets a timer for each of said one or more CDRs that have not been received in accordance to intervals specified in said one or more service specific profiles for one or more network elements responsible for each of said CDRs that have not been received.

In step 370, method 300 determines whether or not said timers for all of the CDRs that are not received for the call expired. If the timers for all of the missing CDRs expired, the method proceeds to step 380. Otherwise, the method remains in step 370 and continues to wait for the missing CDRs.

In step 375, method 300 determines whether or not all of the CDRs for the call are received before the timers expired. If all of the missing CDRs for a call are received, the method proceeds to step 390 to construct a CDR set for the complete set of CDRs for the call. Otherwise, the method proceeds to step 380.

In step 380, method 300 creates a CDR set for the incomplete set of CDRs for the call. For example, the method creates a CDR set with a CDR set header showing an incomplete set, service ID for the call, number of CDRs expected for the call, number of missing CDRs for the call, addresses of network elements associated with the missing CDRs. The method then proceeds to step 395 to end processing the current CDRs or returns to step 310 to continue receiving CDRs.

In step 390, method 300 creates a CDR set for the complete set of CDRs for said call. The method then proceeds to step 395 to end processing the current CDRs or to return to step 310 to continue receiving CDRs.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
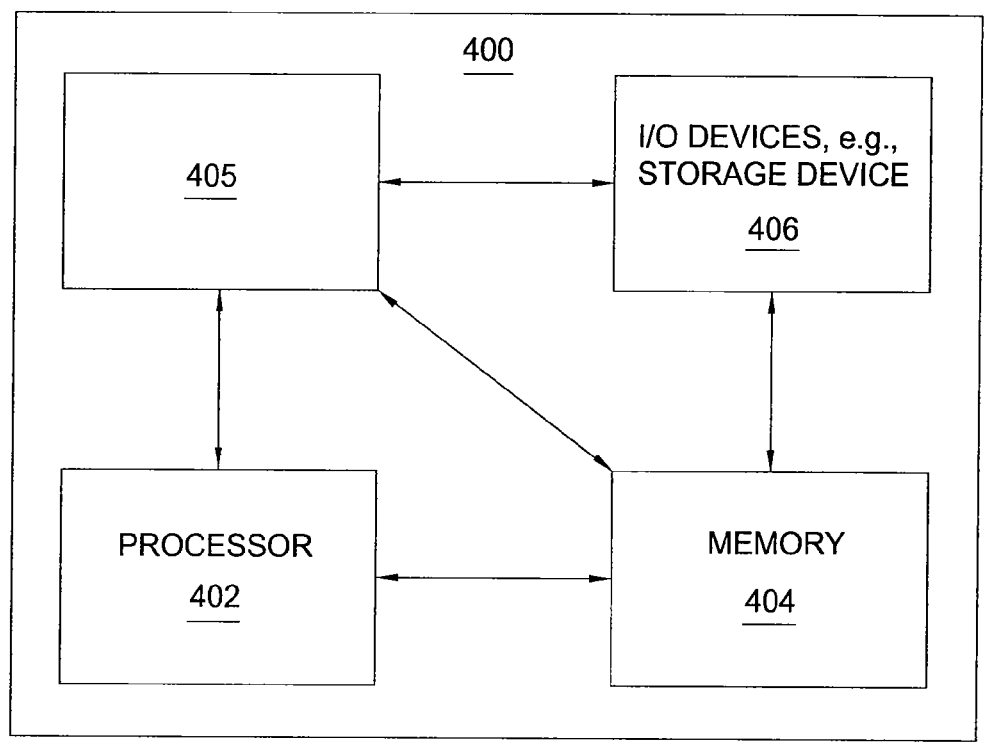
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a call detail record correlation across network elements, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing a call detail record correlation across network elements can be loaded into memory 404 and executed by processor 402 to implement the functions as discussed above. As such, the present method 405 for providing a call detail record correlation across network elements (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing a call correlation across a plurality of network elements, comprising:

receiving by a first correlation engine a plurality of call detail records from the plurality of network elements at a completion of a call, wherein each of the plurality of call detail records contains a correlation identification and a service identification;

identifying a list of expected call detail records for the call, wherein the identifying the list of expected call detail records for the call comprises:

sorting and recording the plurality of call detail records based on their correlation identification;

comparing the service identification of each of the plurality of call detail records against a service specific profile; and identifying the list of expected call detail records for the call in accordance with the service specific profile;
determining whether all of the expected call detail records for the call are received; and
creating a call detail record set for the call.

2. A method for performing a call correlation across a plurality of network elements, comprising:
receiving by a first correlation engine a plurality of call detail records from the plurality of network elements at a completion of a call, wherein each of the plurality of call detail records contains a correlation identification and a service identification;
identifying a list of expected call detail records for the call;
determining whether all of the expected call detail records for the call are received, wherein the determining whether all of the expected call detail records for the call are received comprises:
    determining whether the first correlation engine has received each of the call detail records in the list of expected call detail records for the call;
    determining whether the first correlation engine is assigned by a network service provider to receive each of the expected call detail records for the call that has not been received;
    identifying a second correlation engine that is responsible for collecting a call detail record that has not been received;
    sending a request for a call detail record exchange to the second correlation engine responsible for the call detail record that has not been received; and
    determining whether all call detail records for the call are received in response to the request for the call detail record exchange; and
creating a call detail record set for the call.

3. The method of claim 2, wherein the determining whether all of the expected call detail records for the call are received further comprises:
setting a timer for each call detail record of the plurality of call detail records that have not been received in accordance to a time interval specified in a service specific profile for the plurality of network elements responsible for each of the call detail records that have not been received; and
determining whether all of the expected call detail records for the call are received in accordance with the timer.

4. A method for performing a call correlation across a plurality of network elements, comprising:
receiving by a first correlation engine a plurality of call detail records from the plurality of network elements at a completion of a call, wherein each of the plurality of call detail records contains a correlation identification and a service identification;
identifying a list of expected call detail records for the call;
determining whether all of the expected call detail records for the call are received; and
creating a call detail record set for the call, wherein the call detail record set comprises a call detail record set header, wherein the call detail record set header comprises at least one of:
    a set indicator for indicating a complete set or an incomplete set;
    a service identification;
    a number of call detail records in the call detail record set;
    a number of call detail records missing in the call detail record set; or
    a network element address associated with each missing call detail record.

5. A method for performing a call correlation across a plurality of network elements, comprising:
receiving by a first correlation engine a plurality of call detail records from the plurality of network elements at a completion of a call, wherein each of the plurality of call detail records contains a correlation identification and a service identification;
identifying a list of expected call detail records for the call;
determining whether all of the expected call detail records for the call are received, wherein the determining whether all of the expected call detail records for the call are received comprises:
    setting a tinier for each call detail record of the plurality of call detail records that have not been received in accordance to a time interval specified in a service specific profile for the plurality of network elements responsible for each of the plurality of call detail records that have not been received; and
    determining whether all of the expected call detail records for the call are received in accordance with the timer.

6. A computer-readable medium having stored thereon a plurality of instructions, the plurality of instructions including instructions which, when executed by a processor, cause the processor to perform a method for performing a call correlation across network elements, comprising:
receiving by a first correlation engine a plurality of call detail records from the plurality of network elements at a completion of a call, wherein each of the plurality of call detail records contains a correlation identification and a service identification;
identifying a list of expected call detail records for the call, wherein the identifying the list of expected call detail records for the call comprises:
    sorting and recording the plurality of call detail records based on their correlation identification;
    comparing the service identification of each of the plurality of call detail records against a service specific profile; and
    identifying the list of expected call detail records for the call in accordance with the service specific profile;
determining whether all of the expected call detail records for the call are received; and
creating a call detail record set for the call.

7. A computer-readable medium having stored thereon a plurality of instructions, the plurality of instructions including instructions which, when executed by a processor, cause the processor to perform a method for performing a call correlation across network elements, comprising:
receiving by a first correlation engine a plurality of call detail records from the plurality of network elements at a completion of a call, wherein each of the plurality of call detail records contains a correlation identification and a service identification;
identifying a list of expected call detail records for the call;
determining whether all of the expected call detail records for the call are received, wherein the determining whether all of the expected call detail records for the call are received comprises:
    determining whether the first correlation engine has received each of the call detail records in the list of expected call detail records for the call;

determining whether the first correlation engine is assigned by a network service provider to receive each of the expected call detail records for the call that has not been received;

identifying a second correlation engine that is responsible for collecting a call detail record that has not been received;

sending a request for a call detail record exchange to the second correlation engine responsible for the call detail record that has not been received; and determining whether all call detail records for the call are received in response to the request for the call detail record exchange; and creating a call detail record set for the call.

8. The computer-readable medium of claim 7, wherein the determining whether all of the expected call detail records for the call are received further comprises:

setting a timer for each call detail record of the plurality of call detail records that have not been received in accordance to a time interval specified in a service specific profile for the plurality of network elements responsible for each of the call detail records that have not been received; and determining whether all of the expected call detail records for the call are received in accordance with the timer.

9. A computer-readable medium having stored thereon a plurality of instructions, the plurality of instructions including instructions which, when executed by a processor, cause the processor to perform a method for performing a call correlation across network elements, comprising:

receiving by a first correlation engine a plurality of call detail records from the plurality of network elements at a completion of a call, wherein each of the plurality of call detail records contains a correlation identification and a service identification;

identifying a list of expected call detail records for the call;

determining whether all of the expected call detail records for the call are received; and creating a call detail record set for the call, wherein the call detail record set comprises a call detail record set header, wherein the call detail record set header comprises at least one of:

a set indicator for indicating a complete set or an incomplete set;

a service identification;

a number of call detail records in the call detail record set;

a number of call detail records missing in the call detail record set; or a network element address associated with each missing call detail record.

10. A computer-readable medium having stored thereon a plurality of instructions, the plurality of instructions including instructions which, when executed by a processor, cause the processor to perform a method for performing a call correlation across network elements, comprising:

receiving by a first correlation engine a plurality of call detail records from the plurality of network elements at a completion of a call, wherein each of the plurality of call detail records contains a correlation identification and a service identification;

identifying a list of expected call detail records for the call;

determining whether all of the expected call detail records for the call are received, wherein the determining whether all of the expected call detail records for the call are received comprises:

setting a timer for each call detail record of the plurality of call detail records that have not been received in accordance to a time interval specified in a service specific profile for the plurality of network elements responsible for each of the call detail records that have not been received; and determining whether all of the expected call detail records for the call are received in accordance with the timer.

11. A correlation engine for performing a call correlation across network elements, comprising:

means for receiving a plurality of call detail records from the plurality of network elements at a completion of a call, wherein each of the plurality of call detail records contains a correlation identification and a service identification;

means for identifying a list of expected call detail records for the call;

means for determining whether all of the expected call detail records for the call are received, wherein the means for determining whether all of the expected call detail records determines whether the correlation engine has received each of the call detail records in the list of expected call detail records for the call, determines whether the correlation engine is assigned by a network service provider to receive each of the expected call detail records for the call that has not been received, identifies a second correlation engine that is responsible for collecting a call detail record that has not been received, sends a request for a call detail record exchange to the second correlation engine responsible for the call detail record that has not been received, and determines whether all call detail records for the call are received in response to the request for the call detail record exchange; and means for creating a call detail record set for the call.

* * * * *